(12) United States Patent
Droste et al.

(10) Patent No.: US 10,099,860 B2
(45) Date of Patent: Oct. 16, 2018

(54) CONNECTING DEVICE, CONVEYING CARRIAGE AND CONVEYING INSTALLATION

(71) Applicant: Interroll Holding AG, Sant'Antonino (CH)

(72) Inventors: Heinrich Droste, Sinsheim (DE); Thomas Eisinger, Waibstadt (DE)

(73) Assignee: INTERROLL HOLDING AG, Sant' Antonino (DE)

( * ) Notice: Subject to any disclaimer, the term of this patent is extended or adjusted under 35 U.S.C. 154(b) by 0 days.

(21) Appl. No.: 15/565,790

(22) PCT Filed: Apr. 12, 2016

(86) PCT No.: PCT/EP2016/000604
§ 371 (c)(1),
(2) Date: Oct. 11, 2017

(87) PCT Pub. No.: WO2016/165822
PCT Pub. Date: Oct. 20, 2016

(65) Prior Publication Data
US 2018/0118465 A1    May 3, 2018

(30) Foreign Application Priority Data

Apr. 15, 2015    (DE) .................. 10 2015 004 787

(51) Int. Cl.
*B65G 47/46* (2006.01)
*B65G 17/42* (2006.01)
(Continued)

(52) U.S. Cl.
CPC ........... *B65G 17/42* (2013.01); *B65G 17/005* (2013.01); *B65G 17/345* (2013.01); *B65G 47/94* (2013.01); *B65G 2812/02069* (2013.01)

(58) Field of Classification Search
CPC .... B65G 47/38; B65G 47/962; B65G 47/965; B65G 47/46; B65G 17/42; B65G 17/345; B65G 17/005
(Continued)

(56) References Cited

U.S. PATENT DOCUMENTS 4,616,570 A    10/1986  Dehne
4,646,650 A    3/1987  Kondo et al.
(Continued)

FOREIGN PATENT DOCUMENTS

DE    78 00 642    4/1978
DE    196 05 570    3/1997
(Continued)

OTHER PUBLICATIONS

International Search Report dated Jul. 13, 2016.
German Office Action dated Feb. 1 2016.

*Primary Examiner* — James R Bidwell
(74) *Attorney, Agent, or Firm* — Gerald E. Hespos; Michael J. Porco; Matthew T. Hespos

(57) ABSTRACT

A connecting device (2-2'''') for connecting a conveying carriage (1-1'''') to a drive chain (4) has a pivot lever (6-6'''') that is connected pivotally to the conveying carriage (1-1''''). A chain fastening (8-8'''') is connectable to the drive chain (4), and an articulated joint (10-10'''') connects the pivot lever (6-6'''') and the chain fastening (8-8''''). The articulated joint (10-10'''') has three degrees of rotational freedom between the pivot lever (6-6'''') and the chain fastening (8-8'''').

10 Claims, 6 Drawing Sheets

(51) Int. Cl.
*B65G 17/34* (2006.01)
*B65G 17/00* (2006.01)
*B65G 47/94* (2006.01)

(58) Field of Classification Search
USPC .................................... 198/370.04, 370.05
See application file for complete search history.

(56) References Cited

U.S. PATENT DOCUMENTS

| | | | |
|---|---|---|---|
| RE37,747 E * | 6/2002 | van den Goor | B65G 17/385 198/370.04 |
| 6,460,681 B1 * | 10/2002 | Coutant | B07C 3/06 198/370.03 |
| 2007/0029166 A1 * | 2/2007 | Lim | B65G 17/066 198/370.04 |
| 2013/0001043 A1 | 1/2013 | Van den Goor et al. | |

FOREIGN PATENT DOCUMENTS

| | | |
|---|---|---|
| DE | 10 2012 009 897 | 11/2013 |
| EP | 0 222 444 | 5/1987 |
| EP | 2 025 628 | 2/2009 |
| GB | 350 006 | 6/1931 |

* cited by examiner

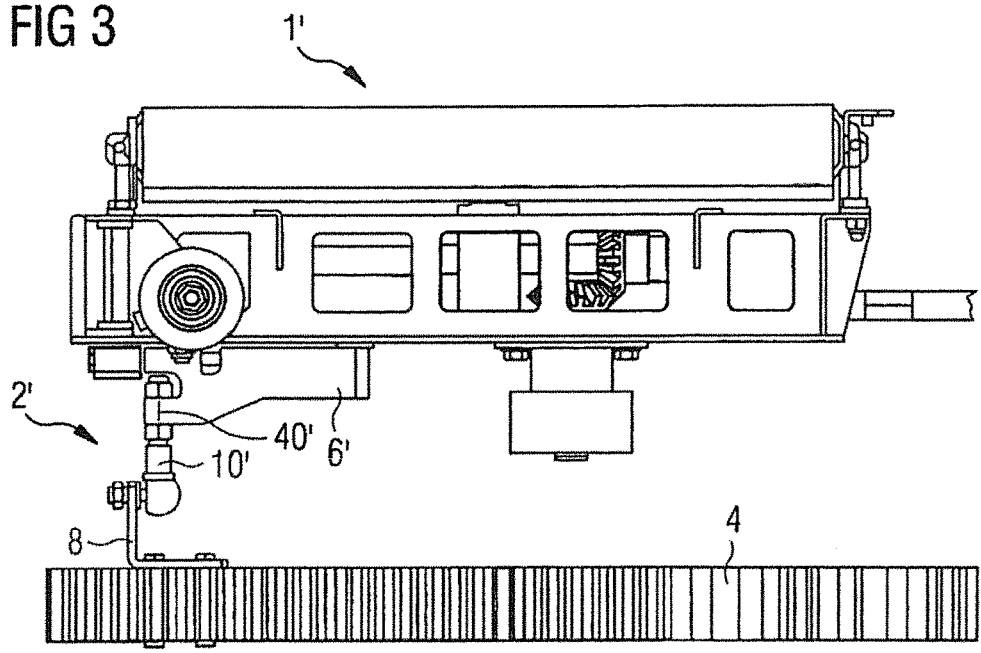
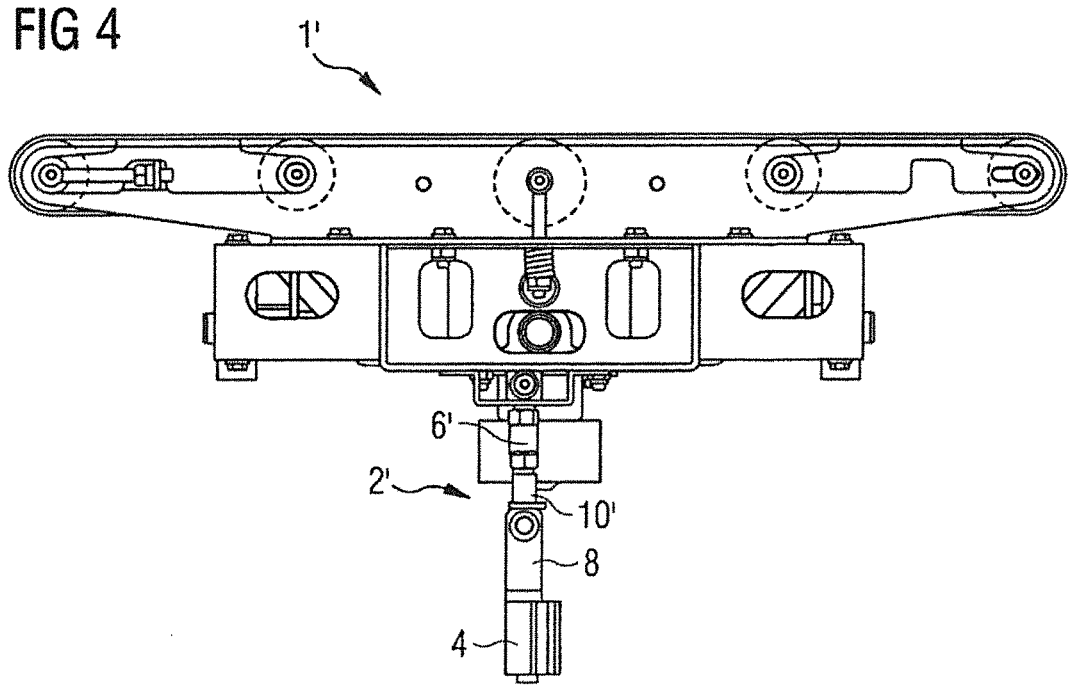

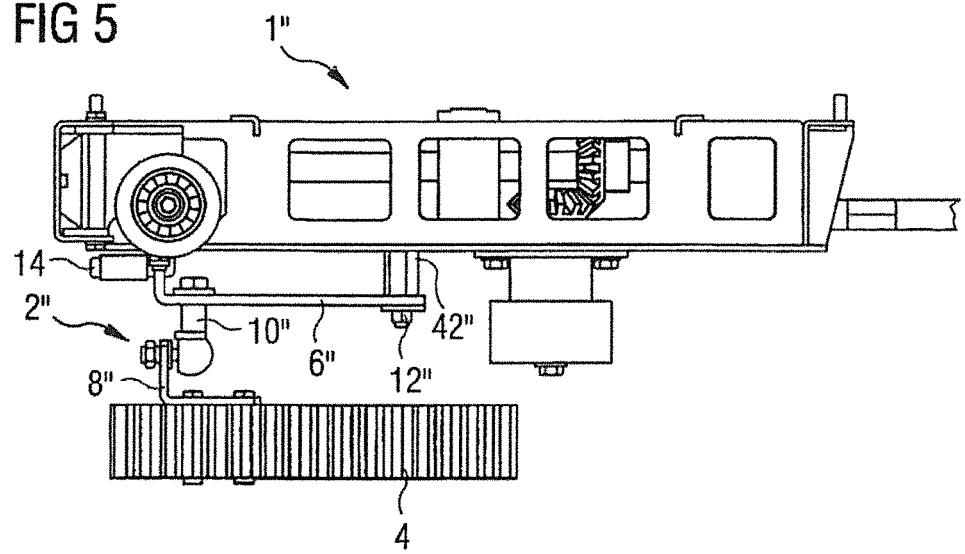
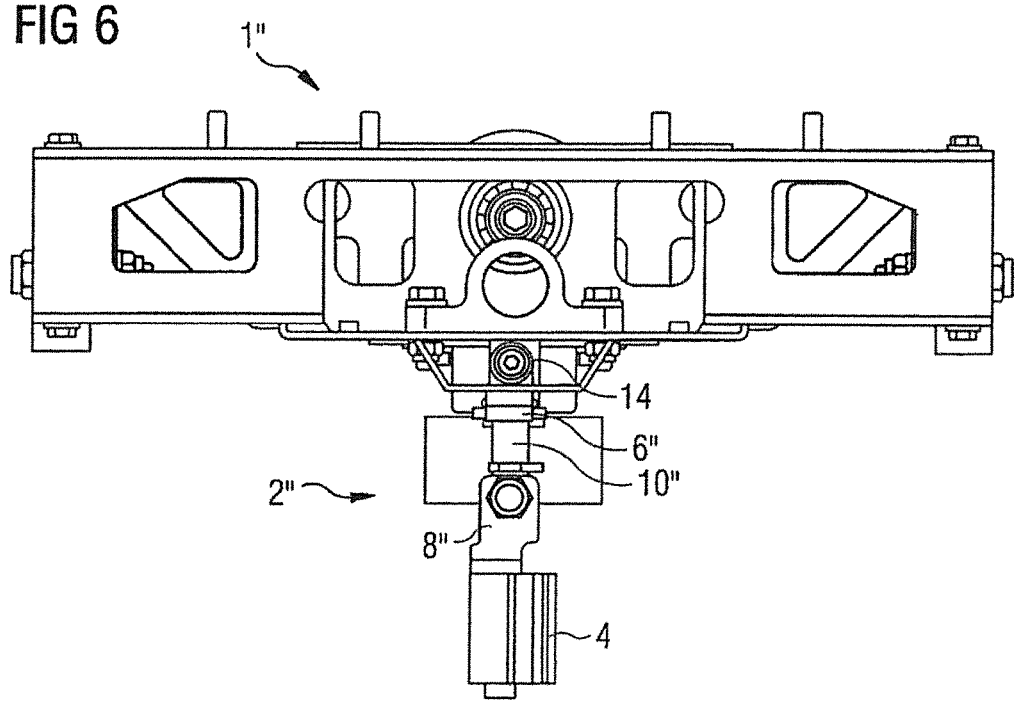

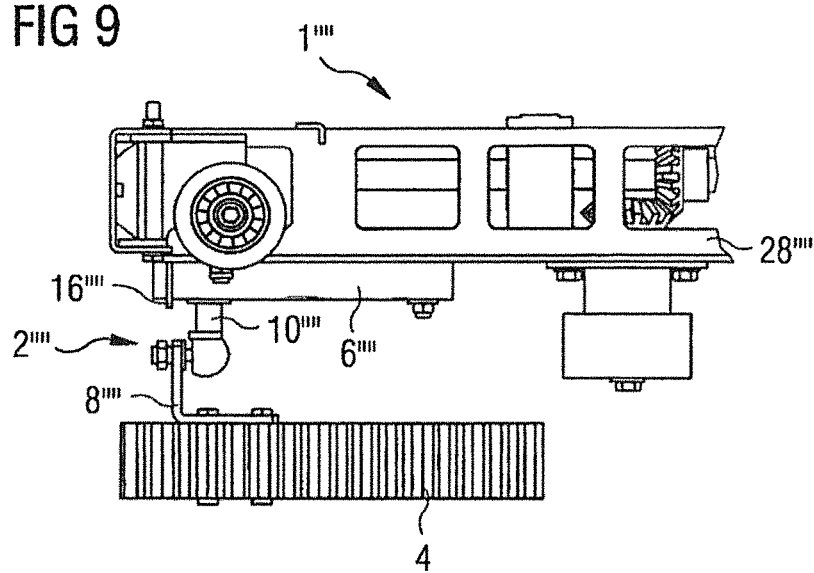
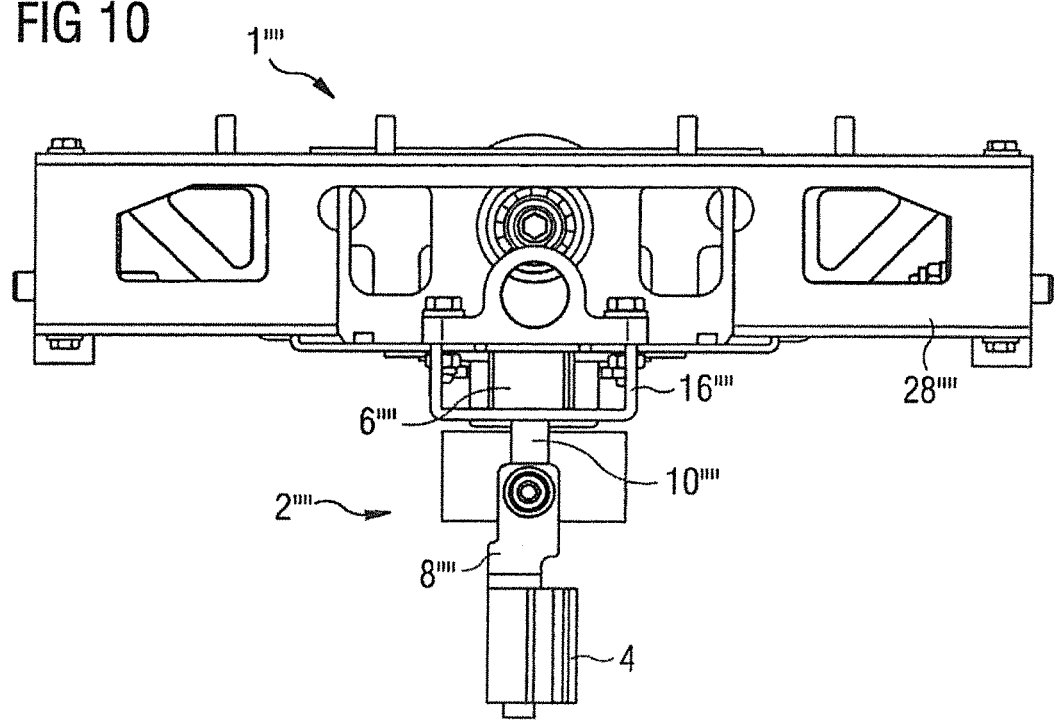

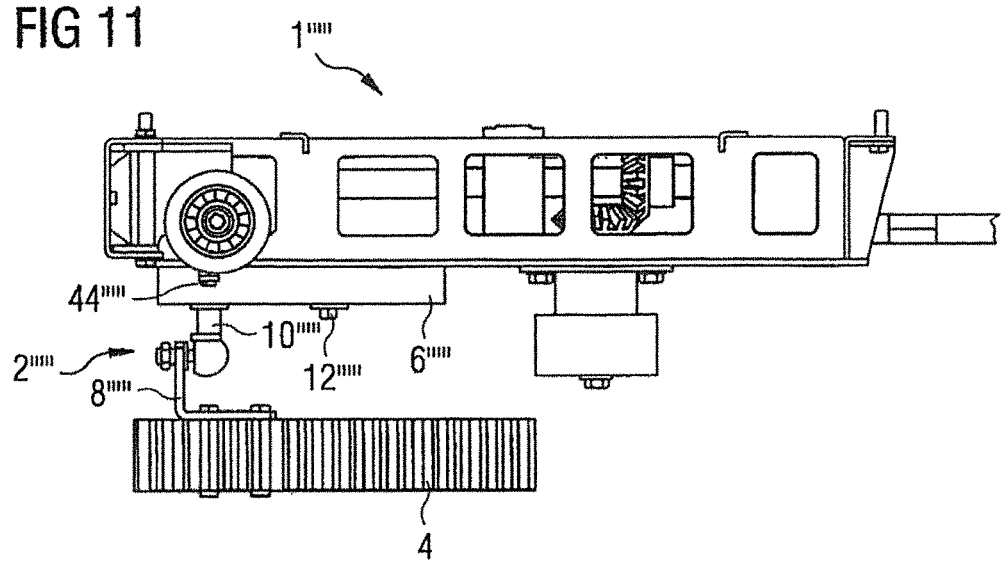
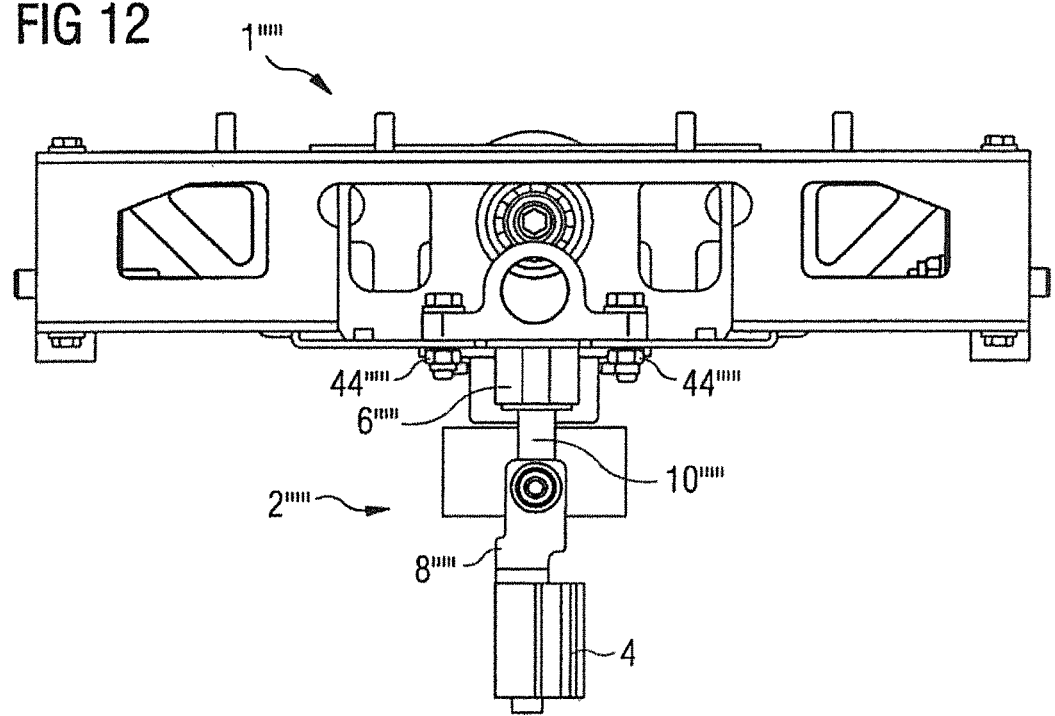

CONNECTING DEVICE, CONVEYING CARRIAGE AND CONVEYING INSTALLATION

BACKGROUND

Field of the Invention

The present invention relates to a connecting device for connecting a conveying carriage to a drive chain, to a conveying carriage and to a conveyor system.

Description of the Related Art

In conveyor technology, use if often made of conveying carriages that are moved on rails along a conveying path to transport goods to be conveyed. In sorting plants, the conveying carriages may each have a conveyor belt as a supporting surface for the conveyed goods, wherein the belt conveying direction of the conveyor belt may extend transversely to the direction of movement of the conveying carriage along the rails. Such sorting plants are also called "cross-belt sorters". By operating the conveyor belt at a desired position of the conveying carriage in the sorting plant, the conveyed goods can be thrown off or discharged to the left or to the right transversely to the direction of movement of the conveying carriage.

Sorting plants, in which the conveying carriages are moved substantially in the horizontal plane, are also referred to as "horizontal sorters". In such conveyor systems, the rails are arranged substantially in the horizontal plane, and a drive chain, usually made of elastomeric material, is arranged along the conveying path and guided following the course of the rails. "Arranged substantially in the horizontal plane" means that the conveying path or rails may also have ascents and/or descents. The drive chain is usually arranged and guided below the rails and, during operation of the conveyor system, is circumferentially constantly in motion. To move the conveying carriages on the rails along the conveying path, the conveying carriages are connected to the drive chain via connecting devices. Here, the problem arises that the position and orientation of the conveying carriage and the drive chain relative to each other along the conveying path is variable. This is especially the case in curves and in ascending/descending sections of the conveying path due to the polygon effect, since the guide rollers of the conveying carriage, in contrast to the drive chain, do not run on or off in a circular way, so that angulation of the conveying carriage is the result. Thereby, the conveying carriage moves on a polygon with different numbers of chords according to the radius of the rail course. In addition, the attachment point of the drive chain always precedes the attachment point of the conveying carriage. Furthermore, this can be caused by mounting inaccuracies or tolerances.

In order to allow a certain amount of change of the position and orientation of the conveying carriage and of the drive chain relative to each other, complex structures consisting of a plurality of connecting members and joints have been used as connecting devices so far. This leads to a complicated assembly of the conveyor system and to high costs of the connecting devices.

It is therefore an object of the present invention to provide a connecting device as well as a conveying carriage and a conveyor system, which are simple to manufacture and to assemble.

SUMMARY

According to one aspect of the invention a connecting device for connecting a conveying carriage to a drive chain is provided, comprising:—a pivot lever that is pivotally connected to the conveying carriage;—a chain attachment that is connectable to the drive chain; and—an articulated joint that connects the pivot lever and the chain attachment; wherein the articulated joint has three rotational degrees of freedom between the pivot lever and the chain attachment.

Advantageously, the configuration according to the invention provides a stable connecting device between the conveying carriage and the chain drive, which has few parts, is easy to assemble, and is inexpensive to manufacture. Further, the relative movements between the conveying carriage and the drive chain are advantageously received by the connecting device, which leads to a quieter operation, to a lower required drive torque due to lower friction losses, and to an improved service life of the conveyor system.

The conveying carriage may be a conveying carriage or conveying slide of a sorting plant, in particular of a "horizontal sorter". In the assembled state or operating state, the conveying carriage is arranged on the rails of the conveyor system. The conveying carriage may have a conveyor belt as a supporting surface for goods to be conveyed, wherein the belt conveying direction of the conveyor belt may extend transversely to the direction of movement or to the conveying path of the conveying carriage along the rails.

The drive chain may be a drive chain of elastomeric material. With the use of elastomeric material, the drive chain allows for a certain amount of twisting and/or deflection. Preferably, the drive chain is a rubber block chain (RBC), which provides a simple and stable mounting option. The drive chain may be arranged and guided below the rails and, during operation of the conveyor system, may be circumferentially constantly in motion.

The pivot lever may have an elongated shape and, in the assembled state, extend in the horizontal plane at least in sections. The length of the pivot lever may be about 100 mm to about 1000 mm, preferably about 100 mm to about 200 mm. Preferably, the length of the pivot lever is less than the length of the conveying carriage in the conveying direction of the conveying carriage. The pivot lever may also be referred to as a "pivot arm".

"Assembled state" or "operating state" means a state in which the connecting device is connected to the conveying carriage and to the drive chain, and the conveying carriage is positioned and oriented on the rails such that the supporting surface of the conveying carriage for the conveyed goods is in the horizontal plane. Where directions or positions are specified in the present description and claims without explicit mention of the state, these specifications should always be read in context with the assembled state or operating state. The pivot lever may also extend vertically and/or obliquely downward at least in sections, in particular in the connection area with the articulated joint. The pivot lever is pivotable relative to the conveying carriage in particular in the horizontal plane, preferably pivotable relative to the conveying carriage exclusively in the horizontal plane. In a basic state, the pivot lever preferably extends forward substantially in the conveying direction, so that the free end of the pivot lever is arranged at the front. This results in a particularly advantageous connection of the conveying carriage to the drive chain. "Basic state" means a state which the conveying carriage or the connecting device assumes when the conveying carriage is moved along a straight path in the horizontal plane by means of the drive chain. The pivot lever is connected to the conveying carriage preferable at the bottom of the conveying carriage.

The chain attachment can be connectable to the drive chain in particular in a rigid way, i.e. without any degree of freedom with respect to the drive chain. The chain attachment may be a profile piece, for example, which is clamped to the drive chain e.g. by means of two screws. The chain attachment preferably has a section that extends obliquely and/or vertically upward from the drive chain to be connected to the articulated joint. The chain attachment may also comprise a part of a hinge, to form a hinge together with the articulated joint.

The articulated joint connects the pivot lever to the chain attachment in an articulated manner such that the chain attachment has three rotational degrees of freedom with respect to the pivot lever, and vice versa. Thus, the chain attachment is rotatable with respect to the pivot lever about three orthogonal axes, i.e. about the x, y, and z-axes. The same applies to the rotatability of the pivot lever with respect to the chain attachment. The articulated joint between the pivot lever and the chain attachment may also have more than three rotational degrees of freedom. Preferably, the articulated joint between the pivot lever and the chain attachment exclusively has three rotational degrees of freedom. The articulated joint preferably does not have a translatory degree of freedom between the pivot axis and chain attachment. Translatory displacement between the chain attachment relative to the conveying carriage is made possible particularly by the pivotable arrangement of the pivot lever.

On the one hand, the articulated joint can be welded and/or screwed and/or glued to the pivot lever, and be welded and/or screwed and/or glued to the chain attachment on the other hand. However, articulated mounting between the articulated joint and the pivot lever or articulated mounting between the articulated joint and the chain attachment is also conceivable. To compensate for or bridge a distance between the pivot lever and the chain attachment in the vertical direction, the articulated joint may have a compensation portion, for example a threaded rod or the like.

The three rotational degrees of freedom of the articulated joint can be realized by means of a single joint, such as a ball joint. However, the articulated joint may also include a combination of joints.

Preferably, the pivot lever has a pivot joint for connecting to the conveying carriage, wherein, in an assembled state, the pivot lever is pivotable relative to the conveying carriage in a horizontal plane by means of the pivot joint.

The pivot joint may be a hinge joint. For example, the hinge joint may be formed by a bore in the pivot lever and a screw extending therethrough in the vertical direction. The pivot joint preferably exclusively has one rotational degree of freedom. However, the pivot joint may also have more degrees of freedom and e.g. be designed as a ball joint, wherein the connecting device may comprise a pivot guide in this case, by means of which the movement of the pivot lever is guided in the horizontal plane.

In one embodiment, the pivot joint is arranged at an end portion of the pivot lever, in particular at a rear end portion, in the conveying direction, of the pivot lever.

In one embodiment, the articulated joint is arranged at an end portion of the pivot lever, in particular at a front end portion, in the conveying direction, of the pivot lever.

"Conveying direction" means the direction of conveyance or direction of movement of the conveying carriage along the conveying path. The pivot joint comprises two end portions, namely a rear end portion and a front end portion. "Rear end portion" may mean the entire rear portion of the pivot lever from the center of the pivot lever. "Front end portion" may mean the entire front portion of the pivot lever from the center of the pivot lever. Preferably, the pivot joint and the articulated joint are arranged on the pivot lever in a manner spaced apart from each other, wherein the distance may be more than about 40%, preferably more than about 50%, particularly preferably more than about 60% of the total length of the pivot lever. Preferably, the articulated joint is arranged in front of the pivot joint on the pivot lever in the conveying direction.

The articulated joint may comprise a ball joint. The provision of a ball joint enables the necessary degrees of freedom between the chain attachment and the pivot lever in a simple manner by means of a component.

The joint head of the ball joint may be screwed and/or welded and/or glued to the chain attachment. Alternatively, however, the joint socket of the ball joint may be screwed to the chain attachment. Preferably, the articulated joint exclusively comprises a ball joint. Particularly preferably, the connecting means between the conveying carriage and the drive chain has exclusively comprises the pivot joint and the ball joint as articulated connecting elements.

In one embodiment, an opening of a joint socket of the ball joint is directed to the front substantially in the conveying direction. In particular, the opening of the joint socket may be directed to the front in the basic state of the pivot lever. Advantageously, this configuration provides an overload protection, since the ball bearing can function as a predetermined breaking point. In the configuration of the ball bearing opened to the front, the joint head of the ball bearing can be pulled out of the joint socket to the front in the conveying direction upon an abrupt stop of the conveying carriage, for example in a collision of the conveying carriage with an obstacle. Thus, damage to the conveying carriage, the drive chain and/or the rails of the conveyor system is prevented. Therefore, this eliminates the need to provide a separate predetermined breaking point or overload protection.

The connecting device further comprises a pivot limitation for limiting the pivot range of the pivot lever. The pivot limitation may be arrangeable on the conveying carriage.

The pivot limitation may be two abutments that surround the pivot lever in the basic state on both sides in the horizontal direction. The abutments may have a plate-shaped design and be welded and/or screwed and/or glued to the conveying carriage, in particular to the bottom thereof. However, it is also possible to use already existing screws, which protrude at the bottom of the conveying carriage, as abutments, such as the screws for securing the friction bearing or the pedestal bearing of the conveying carriage.

The connecting device may further comprise a pivot guide that guides and/or supports a free end of the pivot lever. The pivot guide may be arrangeable on the conveying carriage. The pivot guide supports the free end of the pivot lever in the vertical direction and thus guides the pivot lever in the horizontal plane. By means of the pivot guide, the pivot joint can be relieved advantageously. The free end of the pivot lever may have a guide roller, which cooperates with the pivot guide, whereby sliding of the pivot lever in the pivot guide is improved. The guide roller may be supported on the pivot lever by means of a plain bearing bush. The pivot guide is preferably a bracket, which is welded, screwed and/or glued to the conveying carriage, in particular on an bottom thereof. The bracket can also perform the functions of pivot limitation and the pivot guidance.

In one embodiment, the pivot lever is made of plastic. "Made of plastic" means that the pivot lever is at least partially made of plastic, i.e. comprises plastic. The plastic material for the pivot lever may be a plastic material that has been optimized for sliding movements with very low friction, for example a PE-UHMW (=ultra-high-molecular-weight polyethylene), or polyamide. Plastic is inexpensive and generally has good sliding properties, so that manufacturing costs can be lowered and sliding of the pivot lever in the pivot guide can be improved by the use of plastic. Further, regarding the use of plastic for the pivot lever, it is advantageous that a predetermined breaking point and thus an overload protection can be provided. In particular, the pivot lever can be configured such that upon an abrupt stop of the conveying carriage, for example in a collision of the conveying carriage with an obstacle, the pivot lever made of plastic breaks.

The invention may further relate to a conveying carriage comprising the above-described connecting device. The pivot lever may be connected pivotally to the conveying carriage.

The invention may further relate to a conveyor system, comprising:—at least one conveying carriage;—rails arranged along a conveying path; and—at least one drive chain arranged following substantially the course of the rails; wherein the conveying carriage is arranged on the rails, and wherein the conveying carriage is connected to the drive chain by means of a connecting device described above.

The conveyor system may be a sorting system, in particular a "cross-belt sorter" of the "horizontal sorter" type.

The above description in relation to the inventive connecting device also applies to the inventive conveying carriage and to the inventive conveyor system.

In the following, embodiments of the present invention will be described in more detail with reference to the accompanying figures. It is understood that the present invention is not limited to these embodiments and that individual features of the embodiments can be freely combined to form new embodiments.

BRIEF DESCRIPTION OF THE DRAWINGS

FIG. 3 is a side view of a conveying carriage with a connecting device according to a second embodiment.

FIG. 4 is a front view of the conveying carriage with the connecting device according to the second embodiment.

FIG. 5 is a side view of a conveying carriage with a connecting device according to a third embodiment.

FIG. 6 is a front view of the conveying carriage with the connecting device according to the third embodiment.

FIG. 9 is a side view of a conveying carriage with a connecting device according to a fifth embodiment.

FIG. 10 is a front view of the conveying carriage with the connecting device according to the fifth embodiment.

FIG. 11 is a side view of a conveying carriage with a connecting device according to a sixth embodiment.

FIG. 12 is a front view of the conveying carriage with the connecting device according to the sixth embodiment.

DETAILED DESCRIPTION

Figure 1:
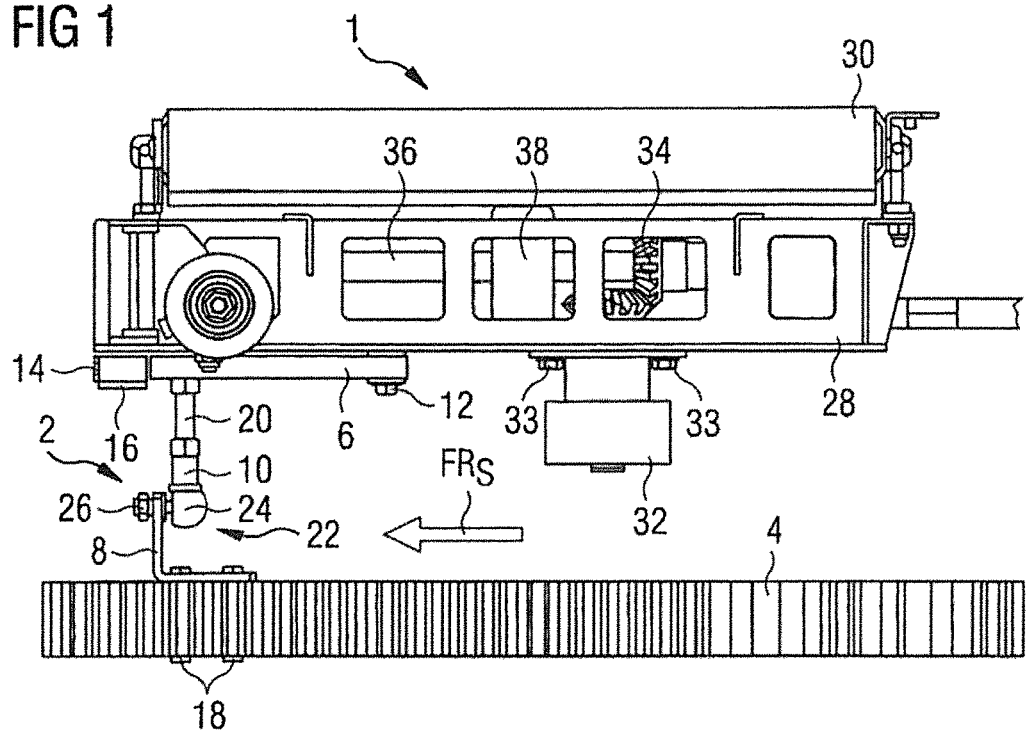
FIG. 1 is a side view of a conveying carriage with a connecting device according to a first embodiment.
Figure 2:
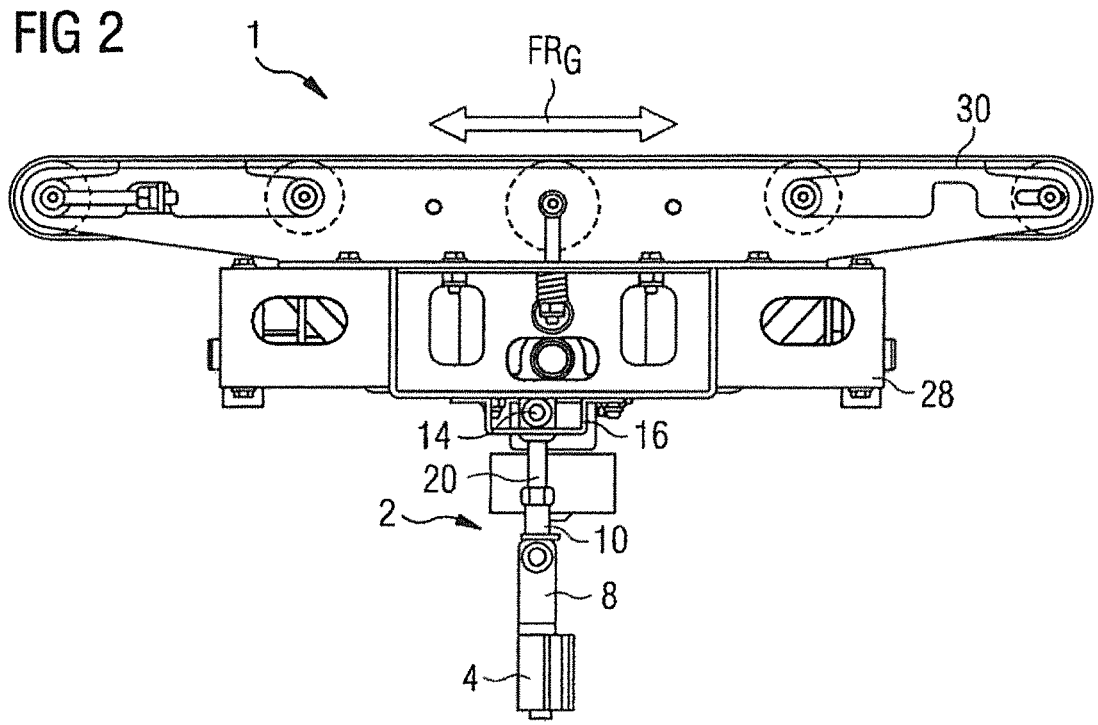
FIG. 2 is a front view of the conveying carriage with the connecting device according to the first embodiment.

FIGS. 1 and 2 show a conveying carriage 1 with a connecting device 2 according to a first embodiment. Here, FIG. 1 shows the conveying carriage 1 in a view from the side with respect to the longitudinal direction of the conveying carriage or to the conveying direction FRS of the conveying carriage 1. FIG. 2, however, shows the conveying carriage 1 in a view from the front with respect to the conveying direction FRS of the conveying carriage 1.

The connecting device 2 connects the conveying carriage 1 to the drive chain 4, which is arranged and movable along the conveying direction FRS. The connecting device 2 has a pivot lever 6, a chain attachment 8, and an articulated joint 10. The pivot lever 6 extends to the front in the horizontal direction and, at a rear end thereof in the conveying direction FRS, comprises a pivot joint 12 in the form of a hinge joint, which is screwed to the conveying carriage 1 at the bottom thereof. The front, free end of the pivot lever 6 comprises a guide roller 14 guided in a pivot guide 16, wherein the pivot guide is designed in the form of a bracket-shaped bent sheet, which is welded to the bottom of the conveying carriage 1. The pivot lever 6 is made of unformed flat steel.

The chain attachment 8 comprises an L-shaped angle profile, which is connected to the drive chain 4 by means of two fixing screws 18 in a rigid way, i.e. without degrees of freedom. To this end, the drive chain 4, which is a rubber block chain (ETC), may comprise mounting recesses through which the fastening screws 18 can be inserted. At an upper end, in the vertical direction, of the chain attachment 8 a bore or recess may be formed to connect the chain attachment 8 to the articulated joint 10.

The articulated joint 10 comprises a threaded rod 20, which is screwed to a front end portion of the pivot lever 6 at an upper end, in the vertical direction, thereof. At its lower end, the threaded rod 20 is connected to a ball joint 22, in particular to the joint socket 24 thereof. The opening of the joint socket 24 is directed to the front. The pin of the joint head 26 extends from the joint socket 24 substantially forward and is screwed to the chain attachment 8.

The conveying carriage 1 is arranged on rails (not shown) and comprises a carriage base 28 and a conveyor belt 30 arranged thereon, which serves as a supporting surface for the material to be conveyed. The belt conveying direction FRG of the conveyor belt extends transversely to the conveying direction FRS of the conveying carriage. For driving the conveyor belt 30, the conveying carriage 1 comprises a friction roller 32 that is rotatable about a vertical axis. Via a bevel gear assembly 34, the rotation of the friction roller 32 is transferred to a drive shaft 36 arranged in the conveying direction in FRS. The drive shaft 36 comprises a drive roller 38, which is engaged with the conveyor belt 30 and can drive it.

The friction roller 32 is secured to the bottom of the conveying carriage 1 via a plurality of friction-roller fastening screws 33. It is conceivable in principle to use one of the friction-roller fastening screws 33 as a fastening screw for the pivot joint 12, thereby saving one screw and reducing the manufacturing costs further.

In order to operate the conveyor belt 30 at a desired position of the conveying path, a friction element (not shown) can be provided at this desired position, which friction element engages with the friction roller 32 when passing the conveyor carriage and rotates it. Depending on the side of the friction roller on which the friction element 32 is arranged, the conveyor belt can be moved either in one or the other belt conveying direction FRG. The friction element may be controllable.

FIGS. 3 and 4 show a conveying carriage 1' with a connecting device 2' according to a second embodiment. The second embodiment differs from the first embodiment only in the construction of the pivot lever 6'. With respect to the remaining features, reference is therefore made to the description of the first embodiment.

Unlike the first embodiment, the pivot lever 6' of the second embodiment is produced in the aluminum die-casting process. In this way, the production costs can be reduced further. Further, at the front end portion thereof, the pivot lever 6' comprises an attachment arm 40 for attachment of the articulated joint 10, said attachment arm 40 being set lower in the vertical direction.

FIGS. 5 and 6 show a conveying carriage 1" with a connecting device 2" according to a third embodiment. It should be noted that for the sake of simplicity, the conveyor belt is not shown in FIGS. 5 to 12. The third embodiment differs from the first embodiment only in the construction of the pivot lever 6" and the articulated joint 10". With respect to the remaining features, reference is therefore made to the description of the first embodiment.

Unlike the first embodiment and the second embodiment, the pivot lever 6" of the third embodiment is formed of a bent metal sheet. The pivot joint 12" at the rear end of the pivot lever 6" has an axial extension 42. From the rear end of the pivot lever 6", the pivot lever 6" extends forward in the horizontal direction up to the attachment point of the articulated joint 10". After that, the pivot lever 6" is bent upward by about 90° and finally comprises the guide roller 14 at its end. Thanks to the axial extension 42, which serves as a spacer between the bottom of the conveying carriage 1" and the pivot lever 6", sufficient space is provided for assembling the articulated joint 10". Unlike the first and second embodiments, the articulated joint 10" does not comprise a threaded rod, but a threaded bore, which extends in the vertical direction in the articulated joint 10". The articulated joint 10" can therefore be connected to the pivot lever 6" by means of a simple screw.

Figure 7:
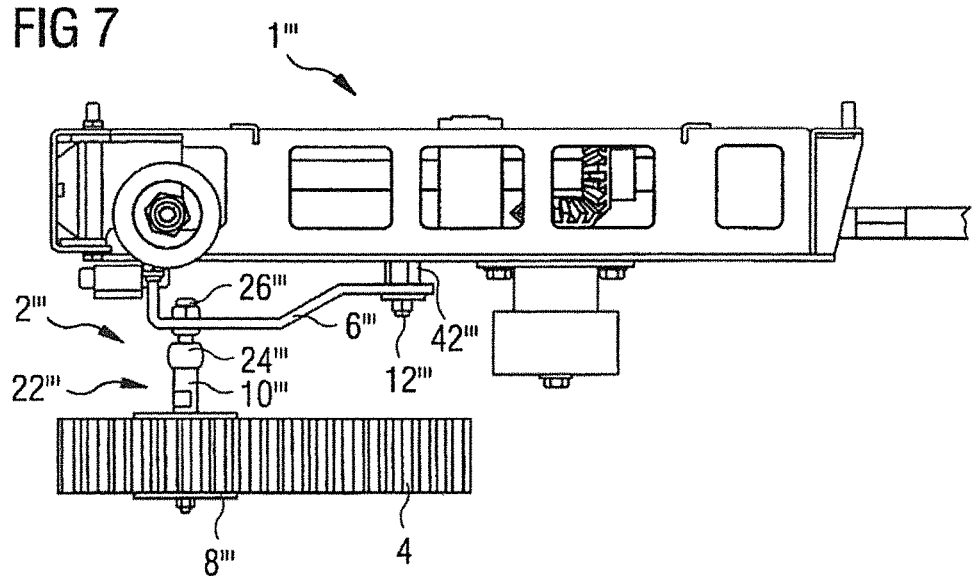
FIG. 7 is a side view of a conveying carriage with a connecting device according to a fourth embodiment.
Figure 8:
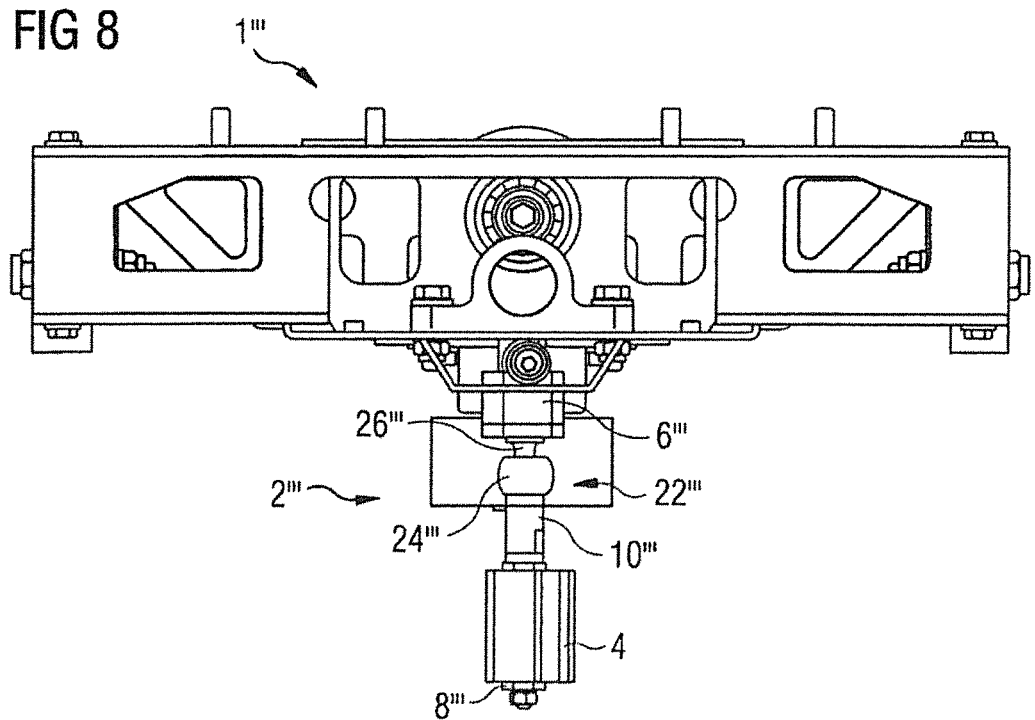
FIG. 8 is a front view of the conveying carriage with the connecting device according to the fourth embodiment.

FIGS. 7 and 8 show a conveying carriage 1''' with a connecting device 2''' according to a fourth embodiment. The fourth embodiment differs from the first embodiment in the configuration of the pivot lever 6''' and the joint device 10''' and the chain attachment 8'''. The configuration of the pivot lever 6''' corresponds approximately to that of the third embodiment. The axial extension 42''' is only slightly shorter and the pivot lever 6''' extends forward from the pivot joint 12''' in the horizontal direction at first, then has an inclined, forward-sloping portion, and then extends further forward in the horizontal direction up to the attachment point of the articulated joint 10'''. With respect to the remaining features, reference is therefore made to the description of the first embodiment.

Unlike the first to third embodiments, the ball joint 22''' of the fourth embodiment is not designed as an angle joint, but as an axial joint. In other words, the pin of the joint head 26''' and the pin of the joint socket 24''' lie on one line in the basic position. In the case of an angle joint according to the first to third embodiments, the pins are arranged perpendicular to one another, however. In the fourth embodiment, the joint head 26'''' is screwed to the pivot lever 6''', and the joint socket side of the articulated joint 10''' is screwed to the chain attachment 8''' and to the drive chain 4. In this case, two plates are clamped above and below the drive chain 4. They fix two bolts that abut a rubber block of the rubber block chain 4 on both sides. The opening of the joint socket 24''' is directed vertically upward. The configuration according to the fourth embodiment enables a simple attachment to the drive chain 4 with improved anti-twist protection and with improved absorption of torque at slop transitions and during start-up.

FIGS. 9 and 10 show a conveying carriage 1'''' with a connecting device 2'''' according to a fifth embodiment. The fifth embodiment differs from the first embodiment only in the construction of the pivot lever 6'''' and the articulated joint 10''''. With respect to the remaining features, reference is therefore made to the description of the first embodiment.

In the fifth embodiment, the pivot lever 6'''' is made of plastic, in particular of PE-UHMW or polyamide, wherein the free end of the pivot lever 6'''' is guided in the bracket-shaped or lug-shaped pivot guide 16''''. Thanks to the use of plastic with good sliding properties, a guide roller can be dispensed with in the fifth embodiment. Further, the pivot guide 16'''' can be made substantially thinner, so that a metal sheet portion bent out from the carriage base 28'''' may be sufficient. The articulated joint 10'''' is attached at the front end portion of the pivot lever 6". The articulated joint 10'''' can be screwed and/or glued to the pivot lever 6''''.

FIGS. 11 and 12 show a conveying carriage 1''''' with a connecting device 2''''' according to a sixth embodiment. The sixth embodiment differs from the fifth embodiment in that no pivot guide 16 is provided, and in that the pivot joint 12''''' is arranged in an area of the rear end portion of the pivot lever 6''''' that is approximated to the center of the pivot lever 6'''''. By this arrangement, the rear end of the pivot lever 6''''' acts as a support against vertical tensile forces, which act on the pivot lever 6''''' from the articulated joint 10''''' by omitting the pivot guide 16 at the front end portion of the pivot lever 6''''' and create a torque. As a further difference to the fifth embodiment, in the sixth embodiment, the screws with which the bearings of the guide rollers or pedestal bearings are attached to the conveying carriage and which protrude downward at the bottom of the conveying carriage, are used as pivot limitations 44''''' that limit the pivot range of the pivot lever 6'''''. With respect to the remaining features, reference is made to the description of the first and fifth embodiments.

LIST OF REFERENCE NUMERALS 1-1''''' conveying carriage
2-2''''' connecting device
4 drive chain
6-6''''' pivot lever
8-8''''' chain attachment
10-10''''' articulated joint
12; 12"; pivot joint
12'''; 12'''''
14 guide roller
16; 16'''' pivot guide
18 fastening screw
20 threaded rod
22; 22''' ball joint
24; 24''' joint socket
26 joint head
28; 28'''' carriage base
30 conveyor belt
32 friction roller
33 friction-roller fastening screw
34 bevel gear assembly
36 drive shaft
38 drive roller
40' attachment arm
42"; 42''' axial extension
44''''' pivot limitation
FR$_S$ conveying direction of the conveying carriage
FR$_G$ belt conveying direction of the conveyor belt

The invention claimed is:

1. A conveyor system, comprising:
at least one conveying carriage (1-1"""");
rails arranged along a conveying path; and
at least one drive chain (4) arranged following substantially a course of the rails;
wherein the conveying carriage (1-1"""") is arranged on the rails, and wherein the conveying carriage (1-1"""") is connected to the drive chain (4) by a connecting device (2-2"""") that comprises:
a pivot lever (6-6"""") that has a pivot joint (12; 12"; 12""; 12"""") that pivotally connects the pivot lever (6-6"""") to the conveying carriage (1-1"""") so that the pivot lever (6-6"""") is pivotable relative to the conveying carriage (1-1"""") in a horizontal plane by means of the pivot joint (12; 12"; 12""; 12"""");
a chain attachment (8-8"""") that is connectable to the drive chain (4); and
an articulated joint (10-10"""") that connects the pivot lever (6-6"""") and the chain attachment (8-8"""");
wherein the articulated joint (10-10"""") has three rotational degrees of freedom between the pivot lever (6-6"""") and the chain attachment (8-8"""").

2. A connecting device (2-2"""") for connecting a conveying carriage (1-1"""") to a drive chain (4), comprising:
a pivot lever (6-6"""") that has a pivot joint (12; 12"; 12""; 12"""") that pivotally connects the pivot lever (6-6"""") to the conveying carriage (1-1"""") so that the pivot lever (6-6"""") is pivotable relative to the conveying carriage (1-1"""") in a horizontal plane by means of the pivot joint (12; 12"; 12""; 12"""");
a chain attachment (8-8"""") that is connectable to the drive chain (4); and
an articulated joint (10-10"""") that connects the pivot lever (6-6"""") and the chain attachment (8-8"""");
wherein the articulated joint (10-10"""") has three rotational degrees of freedom between the pivot lever (6-6"""") and the chain attachment (8-8"""").

3. The connecting device (2-2"""") according to claim 1, wherein the pivot joint (12; 12"; 12""; 12"""") is arranged at a rear end portion of the pivot lever in a conveying direction of the pivot lever.

4. The connecting device (2-2"""") according to claim 3, wherein, the articulated joint (10-10"""") is arranged at a front end portion of the pivot lever (6-6"""") in the conveying direction (FR$_S$) of the pivot lever (6-6"""").

5. The connecting device (2-2"""") according to claim 4, wherein the articulated joint (10-10"""") comprises a ball joint.

6. The connecting device (2; 2'; 2"; 2""; 2""") according to claim 5, wherein an opening of a joint socket (24; 24'") of the ball joint (22; 22"") is directed to the front substantially in the conveying direction (FR$_S$).

7. The connecting device (2-2"""") according to claim 1, further comprising a pivot limitation (44"""") for limiting the pivot range of the pivot lever (6-6""""), wherein the pivot limitation (44"""") is arrangeable on the conveying carriage (1-1"""").

8. The connecting device (2-2"""") according to claim 1, further comprising a pivot guide (16; 16"") that guides and/or supports a free end of the pivot lever, wherein the pivot guide (16; 16"") is arrangeable on the conveying carriage (1-1"""").

9. The connecting device (2"; 2"") according to claim 1, wherein the pivot lever (6""; 6"") is made of plastic.

10. A conveying carriage (1-1""""), comprising a connecting device (2-2"""") for connecting the conveying carriage (1-1"""") to a drive chain (4), the conveying carriage comprising:
a pivot lever (6-6"""") that has a pivot joint (12; 12"; 12""; 12"""") that pivotally connects the pivot lever (6-6"""") to the conveying carriage (1-1"""") so that the pivot lever (6-6"""") is pivotable relative to the conveying carriage (1-1"""") in a horizontal plane by means of the pivot joint (12; 12"; 12""; 12"""");
a chain attachment (8-8"""") that is connectable to the drive chain (4); and
an articulated joint (10-10"""") that connects the pivot lever (6-6"""") and the chain attachment (8-8"""");
wherein the articulated joint (10-10"""") has three rotational degrees of freedom between the pivot lever (6-6"""") and the chain attachment (8-8"""").

* * * * *